(12) United States Patent
Bousfield et al.

(10) Patent No.: US 10,995,677 B2
(45) Date of Patent: May 4, 2021

(54) SUPER-COOLED ICE IMPACT PROTECTION FOR A GAS TURBINE ENGINE

(71) Applicant: ROLLS-ROYCE PLC, London (GB)

(72) Inventors: Ian J Bousfield, Nottingham (GB); Duncan A Macdougall, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/813,830

(22) Filed: Mar. 10, 2020

(65) Prior Publication Data

US 2020/0347786 A1 Nov. 5, 2020

Related U.S. Application Data

(63) Continuation of application No. 16/686,274, filed on Nov. 18, 2019, now Pat. No. 10,612,471.

(30) Foreign Application Priority Data

Dec. 14, 2018 (GB) ...................................... 1820423

(51) Int. Cl.
*F02C 7/36* (2006.01)
*F01D 5/14* (2006.01)
(52) U.S. Cl.
CPC ................ *F02C 7/36* (2013.01); *F01D 5/141* (2013.01); *F01D 5/142* (2013.01); *F05D 2220/32* (2013.01); *F05D 2240/24* (2013.01)
(58) Field of Classification Search
None
See application file for complete search history.

(56) References Cited

U.S. PATENT DOCUMENTS

| 2,749,025 A * | 6/1956 | Stalker | F04D 27/0215 |
| | | | 415/181 |
| 6,457,938 B1 * | 10/2002 | Liu | F01D 5/141 |
| | | | 415/160 |
| 7,497,664 B2 * | 3/2009 | Walter | F01D 5/141 |
| | | | 416/223 A |
| 9,416,677 B2 * | 8/2016 | Munsell | F02C 6/08 |
| 2002/0150471 A1 * | 10/2002 | Liu | F01D 5/141 |
| | | | 415/116 |

(Continued)

FOREIGN PATENT DOCUMENTS

EP 1 930 598 A2 6/2008

*Primary Examiner* — David Hamaoui
*Assistant Examiner* — Jason Fountain
(74) *Attorney, Agent, or Firm* — Oliff PLC

(57) ABSTRACT

A gas turbine engine comprises a fan mounted to rotate about a main longitudinal axis; an engine core, comprising in axial flow series a compressor, a combustor, and a turbine coupled to the compressor through a shaft; a reduction gearbox that receives an input from the shaft and outputs drive to the fan so as to drive the fan at a lower rotational speed than the shaft; wherein the compressor comprises a first stage at an inlet and a second stage, downstream of the first stage, comprising respectively a first rotor with a row of first blades and a second rotor with a row of second blades, the first and second blades comprising respective leading edges, trailing edges and tips, and wherein the ratio of a maximum leading edge radius of the first blades to a maximum leading edge radius of the second blades is greater than 2.8.

20 Claims, 4 Drawing Sheets

(56) References Cited

U.S. PATENT DOCUMENTS

2015/0285090 A1\* 10/2015 Munsell .................. F02C 6/08
                                                            415/1
2016/0169034 A1   6/2016 Clarkson et al.
2017/0107906 A1   4/2017 Oggero \* cited by examiner

SUPER-COOLED ICE IMPACT PROTECTION FOR A GAS TURBINE ENGINE

CROSS-REFERENCE TO RELATED APPLICATIONS

This is a Continuation of application Ser. No. 16/686,274 filed Nov. 18, 2019, which claims priority to British Application No. 1820423.0 filed on Dec. 14, 2018. The disclosure of the prior application is hereby incorporated by reference herein in its entirety.

BACKGROUND

1. Field of the Disclosure

The present disclosure relates generally to gas turbine engines, and more specifically to arrangements for super-cooled ice protection for a gas turbine engine.

2. Description of the Related Art

Gas turbine engines are used to power aircraft, watercraft, power generators, and the like. A gas turbine engine generally comprises, in axial flow series from front to aft, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The compressor may be a multi-stage compressor, wherein each compressor stage comprises in axial flow series a row of rotor blades and a row of stator vanes. A radially inner end of the rotor blades are connected to a hub that define an inner annulus. A casing circumscribes the rotor blades and the stator vanes and defines an outer annulus. The rotor blades and the stator vanes each have a root and an aerofoil portion with a tip, a trailing edge and a leading edge.

When operating in ice forming conditions (either super-cooled water ice or high altitude ice crystals), ice can accrete on vanes arranged in the core inlet upstream of the front of the compressor; typically ice is accreted near the outer annulus. When ice is shed from the vanes, which may be owing to aerodynamic loading or vibration, the ice is ingested by the compressor rotor blade stage immediately downstream.

The severity and size of the ice accretion can be significantly higher for geared turbofan architectures owing to the low speed and low hub stagger of the fan.

Different anti-icing systems have been proposed to protect the engine against ice accretion.

According to one of these approaches, the vanes may be provided with electrical heaters to prevent ice build-up, and to melt any ice that accumulates.

Alternatively, relatively hot air bled from the compressor may be directed towards the vanes.

Both systems are complicated to implement and detrimental to efficiency.

There is therefore a need for an improved system for super-cooled ice impact protection for a gas turbine engine.

SUMMARY

According to a first aspect, there is provided a gas turbine engine comprising:
- a fan mounted to rotate about a main longitudinal axis,
- an engine core, comprising in axial flow series a compressor, a combustor, and a turbine coupled to the compressor through a shaft,
- a reduction gearbox that receives an input from the shaft and outputs drive to the fan so as drive the fan at a lower rotational speed than the shaft, wherein the compressor comprises a first stage at an inlet and a second stage, downstream of the first stage, comprising respectively a first rotor with a row of first blades and a second rotor with a row of second blades, the first and second blades comprising respective leading edges, trailing edges and tips, wherein the ratio of a maximum leading edge radius of the first blades to a maximum leading edge radius of the second blades is greater than 2.8.

The blades may comprise an aerofoil portion with a tip, and a root, and a spanwise direction is a direction extending between the tip and the root of the blades, and a chordwise direction is a direction extending between the leading edge and the trailing edge of the blades.

In the present disclosure, upstream and downstream are with respect to the air flow through the compressor; and front and rear is with respect to the gas turbine engine, i.e. the fan being in the front and the turbine being in the rear of the engine.

The maximum leading edge radius is a measure of the blade capacity to withstand super-cooled ice impacts: the greater the maximum leading edge radius, the better the blade capacity to withstand super-cooled ice impacts.

The present inventors have understood that the first rotor may act as a shield against super-cooled ice impact protecting the downstream stages of the compressor. To this purpose, the first blades may be made relatively thicker at the leading edge than the leading edge of the second blades to resist super-cooled ice impacts. The advantage of having the first rotor acting as a shield is that the downstream rotors may be designed to optimise aerodynamic efficiency, without compromises and/or penalties linked to super-cooled ice protection. In other words, the downstream rotors, in particular the second rotor, may not need to be made relatively thicker to resist super-cooled ice impacts, because any super-cooled ice entering the compressor may be effectively dealt with by the first rotor.

Electrical heaters, heat exchangers, or conduits to direct hot air towards the compressor blades and vanes may therefore be reduced, simplified, or even omitted.

According to the disclosure, the ratio of the maximum leading edge radius of the first blades the maximum leading edge radius of the second blades may be greater than 3, or greater than 4, or greater than 5, or greater than 6, or greater than 7, or greater than 8.

The ratio of the maximum leading edge radius of the first blades to the maximum leading edge radius of the second blades may be less than 10.

For example, the ratio of the maximum leading edge radius of the first blades to the maximum leading edge radius of the second blades may be less than 9, or less than 8.

The maximum leading edge radius of the first blade may be located in an area between 70% and 100% of the span height, preferably between 80% and 100%, where 0% corresponds to the root and 100% corresponds to the tip.

The maximum leading edge radius of the first blades may be greater than 0.4 mm, for example greater than 0.45 mm, or greater than 0.5 mm, or greater than 0.55 mm, or greater than 0.6 mm.

The maximum leading edge radius of the first blades may be less than 0.9 mm, for example less than 0.85 mm, or less than 0.80 mm, or less than 0.75 mm, or less than 0.70 mm.

The maximum leading edge radius of the second blades may be comprised between 0.1 and 0.3 mm. For example, the maximum leading edge radius of the second blades may be comprised between 0.1 and 0.25 mm, or between 0.1 and 0.20 mm, or between 0.15 and 0.30 mm, or between 0.15 and 0.25 mm, or between 0.15 mm and 0.20 mm.

The ratio of the maximum leading edge radius of the first blades to a minimum leading edge radius of the first blades may greater than 2.2. For example, the ratio of the maximum leading edge radius of the first blades to the minimum leading edge radius of the first blades may greater than 2.5, or greater than 3, or greater than 4, or greater than 5.

The ratio of the maximum leading edge radius of the first blades to the minimum leading edge radius of the first blades may be less than 7, for example less than 6, or less than 5, or less than 4. The ratio of the maximum leading edge radius of the first blades to the minimum leading edge radius of the first blades may be comprised between 2.2 and 7, for example between 2.5 and 5, or between 2.5 and 4.

The minimum leading edge radius of the first blade may be located in an area less than 50% of the span height, for example less than 40%, or less than 30%, or between 15% and 40% of the span height, or between 20% and 30%.

The minimum leading edge radius of the first blades may be greater than 0.15 mm, for example greater than 0.20 mm, or greater than 0.21 mm, or greater than 0.22 mm, or greater than 0.23 mm, or greater than 0.24 mm.

The minimum leading edge radius of the first blades may be less than 0.6 mm, for example less than 0.55 mm, or less than 0.5, or less than 0.4 mm, or less than 0.35 mm, or less than 0.30 mm.

The ratio of a tip maximum thickness of the second blades to a tip maximum thickness of the first blades may be less than 0.45. For example, the ratio of the tip maximum thickness of the second blades to the tip maximum thickness of the first blades may be less than 0.40, or less than 0.35, or less than 0.30. For example, the ratio of the tip maximum thickness of the second blades to the tip maximum thickness of the first blades may be greater than 0.20, or greater than 0.25, or greater than 0.30. For example, the ratio of the tip maximum thickness of the second blades to the tip maximum thickness of the first blades may be comprised between 0.20 and 0.45, or between 0.25 and 0.45, or between 0.30 and 0.45, or between 0.35 and 0.45, or between 0.40 and 0.45, or between 0.20 and 0.40, or between 0.25 and 0.40, or between 0.30 and 0.40.

As the tip is the area of the blades where super-cooled ice impact is generally more dangerous to blade integrity, by increasing the tip maximum thickness of the first blades only, the first blades may be made more robust against super-cooled ice and may protect the second blades, which in turn may be designed with a tip maximum thickness to optimise aerodynamic performance and not super-cooled ice impact protection.

The tip maximum thickness of the first blades may greater than 2.7 mm, for example greater than 3.0 mm, or greater than 3.5 mm, or greater than 4.0 mm.

The tip maximum thickness of the first blades may be less than 5 mm, for example less than 4.5 mm, or less than 4.0 mm.

The tip maximum thickness of the second blades may be between 1.2 mm and 2.25 mm.

The ratio of the tip maximum thickness of the first blades to the maximum leading edge radius of the first blades may be less than 6.5.

The ratio of the tip maximum thickness of the first blades to the maximum leading edge radius of the first blades may be greater than 2, for example greater than 2.5, or greater than 3, or greater than 3.5, or greater than 4.

The compressor may comprise two or more stages. For example, the compressor may comprise three or four stages. The compressor may comprise less than twelve stages, for example less than eleven, or ten stages.

For example, the compressor may comprise 2 to 8 stages.

The compressor may be an intermediate pressure compressor and the gas turbine engine may further comprise a high pressure compressor downstream of the intermediate pressure compressor.

The turbine may be an intermediate pressure turbine and the gas turbine engine may further comprise a high pressure turbine upstream of the intermediate pressure compressor.

The shaft may be a first shaft and the gas turbine engine may further comprise a second shaft coupling the high pressure turbine to the high pressure compressor.

According to a second aspect, there is provided a gas turbine engine comprising:
  a fan mounted to rotate about a main longitudinal axis,
  an engine core, comprising in axial flow series a compressor, a combustor, and a turbine coupled to the compressor through a shaft,
  a reduction gearbox that receives an input from the shaft and outputs drive to the fan so as to drive the fan at a lower rotational speed than the shaft,
wherein the compressor comprises a first stage at an inlet and a second stage, downstream of the first stage, comprising respectively a first rotor with a row of first blades and a second rotor with a row of second blades, the first and second blades comprising respective leading edges, trailing edges and tips,
wherein the ratio of a tip maximum thickness of the second blades to a tip maximum thickness of the first blades is less than 0.45.

The ratio of the tip maximum thickness of the second blades to the tip maximum thickness of the first blades may be less than 0.40, or less than 0.35, or less than 0.3. For example, the ratio of the tip maximum thickness of the second blades to the tip maximum thickness of the first blades may be greater than 0.20, or greater than 0.25, or greater than 0.30. For example, the ratio of the tip maximum thickness of the second blades to the tip maximum thickness of the first blades may be comprised between 0.20 and 0.45, or between 0.25 and 0.45, or between 0.30 and 0.45, or between 0.35 and 0.45, or between 0.40 and 0.45, or between 0.20 and 0.40, or between 0.25 and 0.40, or between 0.30 and 0.40.

The present disclosure provides alternative solutions to the problem of ice accretion and ingestion, based on increasing the thickness of the first rotor blades only, with a limited effect on efficiency, rather than increasing the thickness of the blades of all rotors to reduce blade deflection, which would be particularly detrimental to efficiency.

In other words, the present disclosure provides for a solution with higher overall efficiency, which is more tolerant to core bird impact, less susceptible to damage, and that does not require complex and/or heavy systems to reduce ice accretion.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm (around 90.5 inches), 235 cm (around 92.5 inches), 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches), cm 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
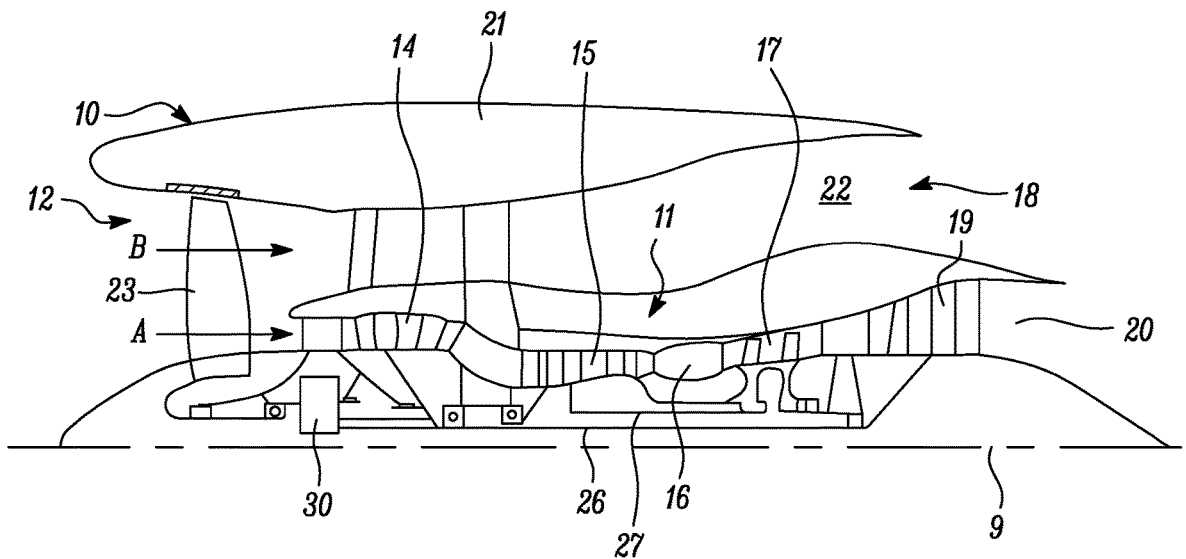
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
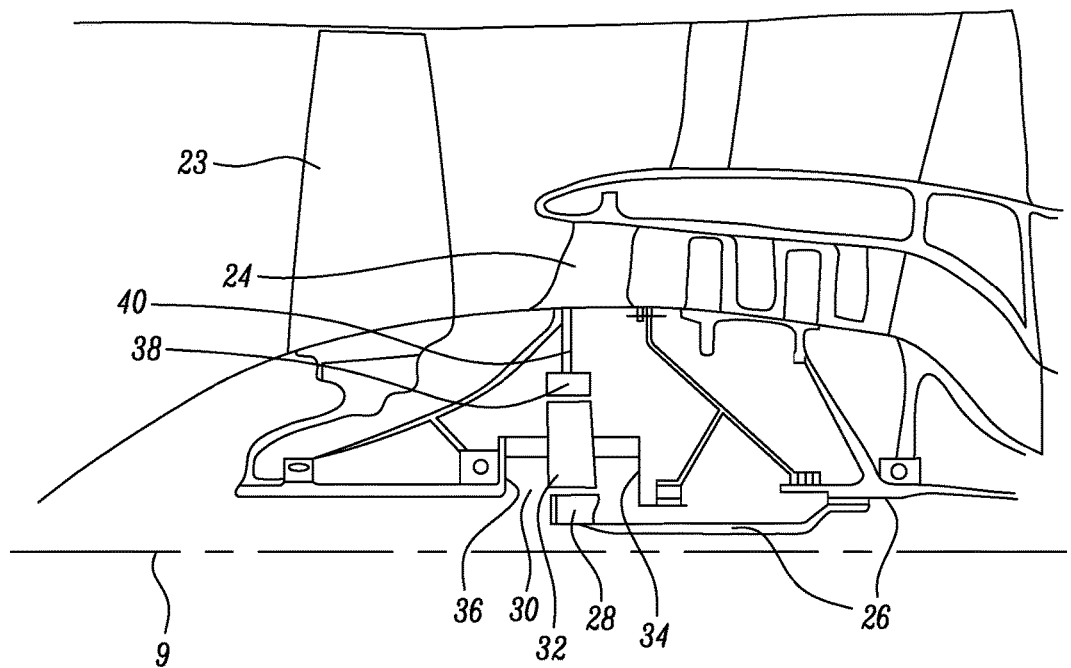
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
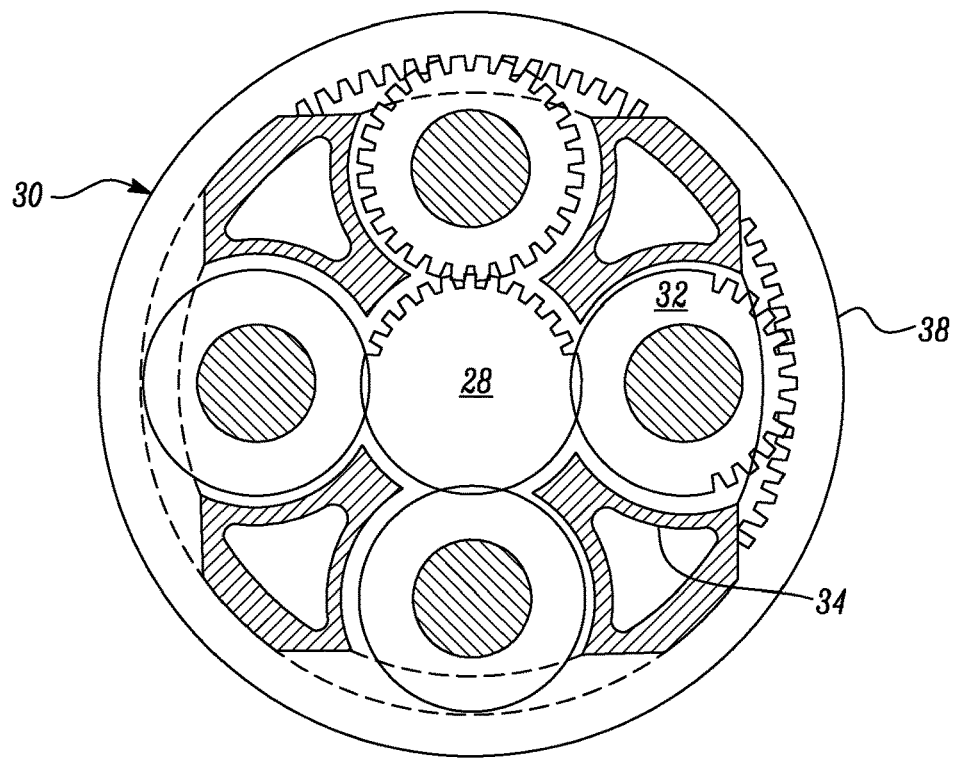
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
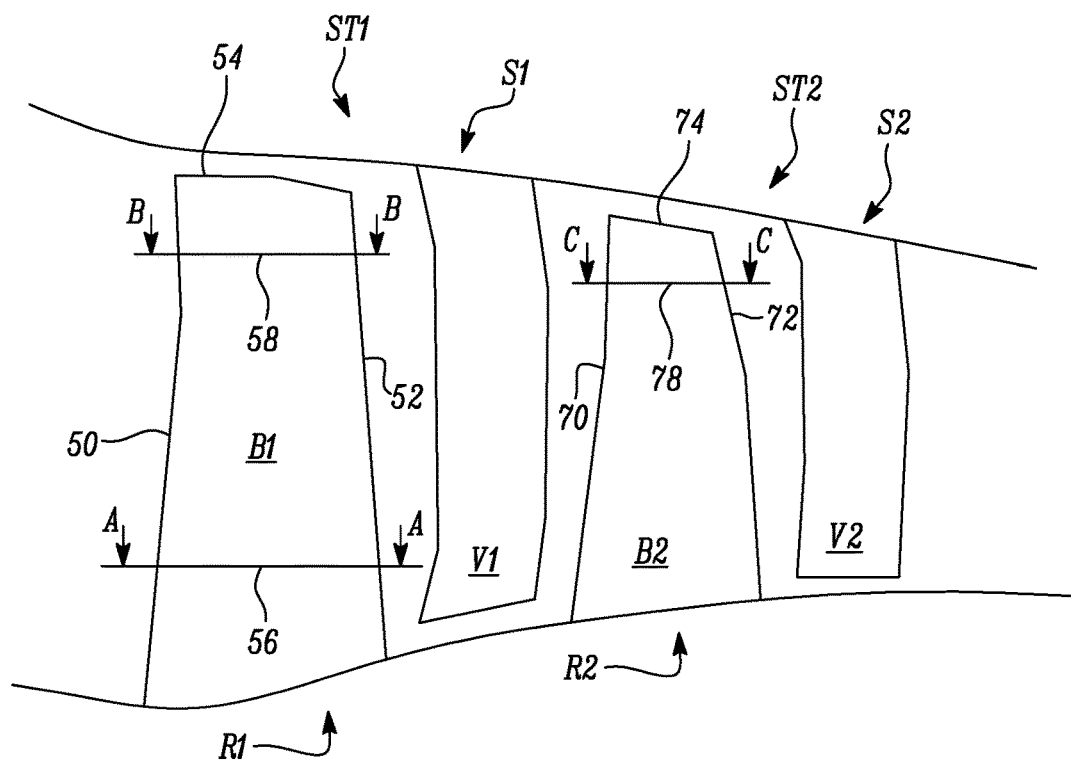
FIG. 4 is an enlarged schematic view of a part of a compressor of the gas turbine engine.

FIG. 4 illustrates a forward part of the low pressure compressor 14 in further detail.

The low pressure compressor 14 comprises a first stage ST1 with a first rotor R1 and a first stator S1, and a second stage ST2 with a second rotor R2 and a second stator S2. The low pressure compressor 14 may comprise other stages, not illustrated.

Each rotor (R1, R2) and stator (S1, S2) comprises a plurality of blades (B1, B2) and vanes (V1, V2), respectively.

In detail, the first rotor R1 and the second rotor R2 comprise a row of first blades B1and second blades B2, respectively; whereas the first stator S1 and the second stator S2 comprise a row of first vanes V1 and second vanes V2, respectively.

The first blades B1 may have a span comprised between 140 mm and 220 mm, and a true chord comprised between 80 mm and 160 mm.

The second blades B2 may have a span comprised between 120 mm and 180 mm, and a true chord comprised between 55 mm and 85 mm.

Each blade B1, B2 and vane V1, V2 comprise a root (not illustrated) and an aerofoil portion with a leading edge, a trailing edge and a tip.

The first blade B1 has a leading edge 50, a trailing edge 52, and a tip 54.

Figure 5:
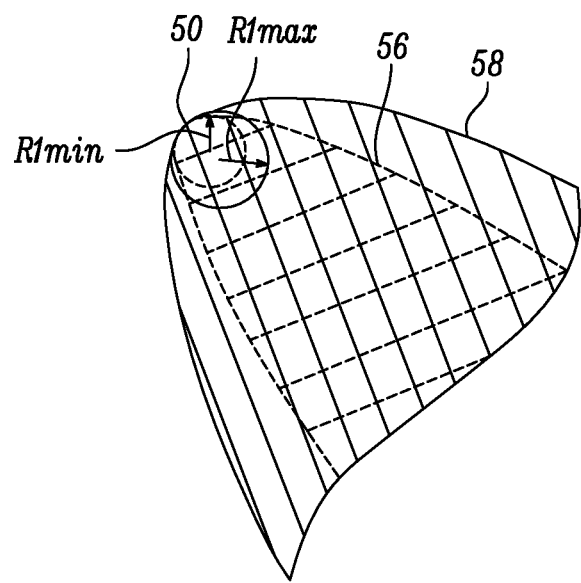
FIG. 5 is a partial schematic view, in cross-section, of a first rotor blade illustrating a difference between a minimum and a maximum leading edge radius.

The leading edge 50 has a leading edge radius variable along the span between a minimum leading edge radius R1min and a maximum leading edge radius R1max. In FIG. 5, there are schematically illustrated the minimum leading edge radius R1min and the maximum leading edge radius R1max by overlapping corresponding cross-sections 56, 58 of the first blades B1 taken along lines A-A and B-B of FIG. 4, respectively, in such a way that the leading edge 50 at those section coincide.

The section 56 containing the minimum leading edge radius R1min, illustrated in dashed line in FIG. 5, may be at a span height between 20% and 30%, where 0% corresponds to the root and 100% corresponds to the tip.

The section 58 containing the maximum leading edge radius R1max may be at a span height between 70% and 100%.

The minimum leading edge radius R1min may be greater than 0.20 mm, for example equal to 0.25 mm.

The maximum leading edge radius R1max may be greater than 0.4 mm, for example equal to 0.7 mm.

The ratio of the maximum leading edge radius R1max of the first blade B1 to the minimum leading edge radius of the first blade B1 may be greater than 2.2, for example equal to 2.8.

The second blade B2 has a leading edge 70, a trailing edge 72, and a tip 74. Analogously to the first blade B1, the leading edge 70 has a leading edge radius variable along the span between a minimum leading edge radius (not illustrated) and a maximum leading edge radius R2max, which is smaller than the maximum leading edge radius R1max of the first blade B1. The maximum leading edge radius R2max of the second blade B2 may be at a cross section 78, corresponding to a span height between 85% and 100%.

Figure 6:
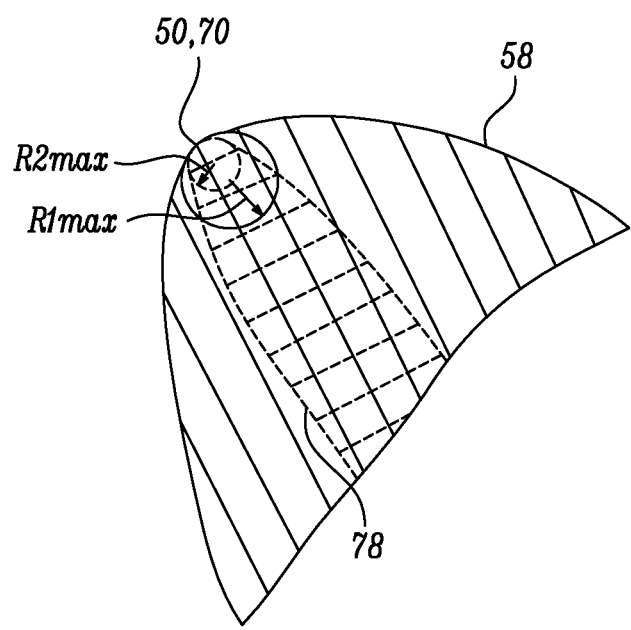
FIG. 6 is a partial schematic view, in cross-section, showing the difference between the maximum leading edge radius of a first rotor blade and a maximum leading edge radius of a second rotor blade.

In FIG. 6 there are illustrated the maximum leading edge radius R1max of the first blade B1 and the maximum leading edge radius R2max of the second blade B2 by superimposing section 58 and section 78 taken along lines C-C of FIG. 4, respectively, in such a way that the leading edge 50 of the first blade B1 and the leading edge 70 of the second blade B2 coincide. Section 78 containing the maximum leading edge radius R2max of the second blade B2 is illustrated in dashed line in FIG. 6.

The maximum leading edge radius R2max of the second blade B2 may be comprised between 0.1 mm and 0.2 mm, for example equal to 0.16 mm.

According to the disclosure, the ratio of the maximum leading edge radius R1max of the first blade B1 to the maximum leading edge radius R2max of the second blade B2 may be greater than 2.8. In an example, the maximum leading edge radius R1max of the first blade B1 may be equal to 0.7 mm and the maximum leading edge radius R2max of the second blade B2 may be equal to 0.16, such that the ratio of the maximum leading edge radius R1max of the first blade B1 to the maximum leading edge radius R2max of the second blade B2 may be equal to about 4.4.

Figure 7A:
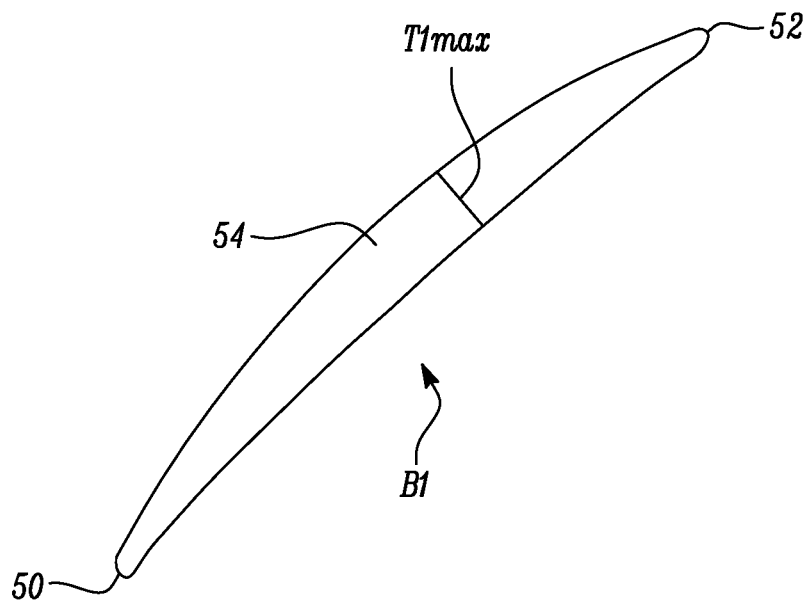
FIGS. 7a and 7b are top views of tips of a first rotor blade and a second rotor blade, respectively.
Figure 7B:
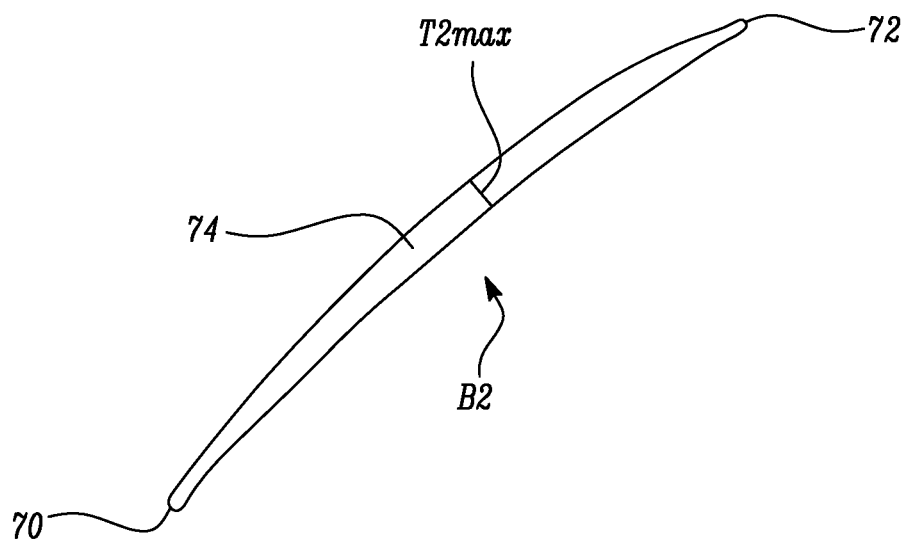

In FIGS. 7a and 7b there are illustrated top views of the tips 54, 74 of first blade B1 and the second blade B2, respectively.

The tip 54 of the first blade B1 features a maximum thickness T1max that may be greater than 2.7 mm, for example equal to 4.3 mm. The maximum thickness T1max may be arranged at a chordwise position between 48% and 54%, for example between 50% and 52%, or about 51%, where 0% corresponds to the leading edge 50 and 100% corresponds to the trailing edge 52.

The tip 74 of the second blade B2 features a maximum thickness T2max that may be greater than 1.2 mm and less than 2.25 mm, for example equal to 1.7 mm. The maximum thickness T2max may be arranged at a chordwise position between 42% and 62%, for example between 48% and 54%, or between 50% and 52%, or about 51%, where 0% correspond to the leading edge 70 and 100% corresponds to the trailing edge 72.

In an example, the tip maximum thickness T2max of the second blade B2 is equal to 1.7 mm, and the tip maximum thickness T1max of the first blade B1 is equal to 4.3 mm, such that their ratio is equal to about 0.40.

In another example, the tip maximum thickness T2max of the second blade B2 is equal to 1.3 mm, and the tip maximum thickness T1max of the first blade B1 is equal to 3.0 mm, such that their ratio is equal to about 0.43.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:
1. A gas turbine engine comprising:
a fan mounted to rotate about a main longitudinal axis,
an engine core, comprising in axial flow series a compressor, a combustor, and a turbine coupled to the compressor through a shaft,
a reduction gearbox that receives an input from the shaft and outputs drive to the fan so as to drive the fan at a lower rotational speed than the shaft, wherein the compressor comprises a first stage at an inlet comprising a first rotor with a row of first blades, the first blades comprising respective leading edges, trailing edges and tips, wherein a ratio of a maximum leading edge radius of the first blades to a minimum leading edge radius of the first blades is greater than 2.2 and less than 7, the maximum leading edge radius being the maximum radius that is defined by the leading edge of the first blades in circumferential cross-section, and the minimum leading edge radius being the minimum radius that is defined by the leading edge of the first blades in circumferential cross-section, and wherein the maximum leading edge radius of the first blades is located in an area between 70% and 100% of a span height, where 0% corresponds to a root of the first blades and 100% corresponds to the tip of the first blades.

2. The gas turbine engine according to claim 1, wherein the maximum leading edge radius of the first blades is greater than 0.4 mm.

3. The gas turbine engine according to claim 1, wherein the maximum leading edge radius of the first blades is less than 0.9 mm.

4. The gas turbine engine according to claim 1, wherein the minimum leading edge radius of the first blades is greater than 0.15 mm.

5. The gas turbine engine according to claim 1, wherein the minimum leading edge radius of the first blades is less than 0.6 mm.

6. The gas turbine engine according to claim 1, wherein the compressor comprises 2 to 8 stages.

7. The gas turbine engine according to claim 1, wherein the compressor is an intermediate pressure compressor, the gas turbine engine further comprising a high pressure compressor downstream of the intermediate pressure compressor; the turbine is an intermediate pressure turbine, the gas turbine engine further comprising a high pressure turbine upstream of the intermediate pressure compressor; and the shaft is a first shaft, the gas turbine engine further comprising a second shaft coupling the high pressure turbine to the high pressure compressor.

8. The gas turbine engine according to claim 1, wherein the minimum leading edge radius of the first blades is located in an area less than 50% of a span height, where 0% corresponds to a root of the first blades and 100% corresponds to the tip.

9. A gas turbine engine comprising:
a fan mounted to rotate about a main longitudinal axis,
an engine core, comprising in axial flow series a compressor, a combustor, and a turbine coupled to the compressor through a shaft,
a reduction gearbox that receives an input from the shaft and outputs drive to the fan so as to drive the fan at a lower rotational speed than the shaft,
wherein the compressor comprises a first stage at an inlet and a second stage, downstream of the first stage, comprising respectively a first rotor with a row of first blades and a second rotor with a row of second blades, the first and second blades comprising respective leading edges, trailing edges and tips, wherein a ratio of a tip maximum thickness of the first blades to a maximum leading edge radius of the first blades is less than 6.5, the maximum leading edge radius being the maximum radius that is defined by the leading edge of the first blades in circumferential cross-section.

10. The gas turbine engine according to claim 9, wherein the ratio of the tip maximum thickness of the first blades to the maximum leading edge radius of the first blades is greater than 2.

11. The gas turbine engine according to claim 9, wherein the maximum leading edge radius of the first blades is located in an area between 70% and 100% of a span height, where 0% corresponds to a root of the first blades and 100% corresponds to the tip.

12. The gas turbine engine according to claim 9, wherein a ratio of the maximum leading edge radius of the first blades to a minimum leading edge radius of the first blades is comprised between 2.2 and 7.

13. The gas turbine engine according to claim 12, wherein the minimum leading edge radius of the first blades is located in an area less than 50% of a span height, where 0% corresponds to a root of the first blades and 100% corresponds to the tip.

14. The gas turbine engine according to claim 9, wherein the tip maximum thickness of the first blades is greater than 2.7 mm.

15. The gas turbine engine according to claim 9, wherein the tip maximum thickness of the first blades is less than 5 mm.

16. The gas turbine engine according to claim 9, wherein the compressor comprises 2 to 8 stages.

17. The gas turbine engine according to claim 9, wherein the compressor is an intermediate pressure compressor, the gas turbine engine further comprising a high pressure compressor downstream of the intermediate pressure compressor; the turbine is an intermediate pressure turbine, the gas turbine engine further comprising a high pressure turbine upstream of the intermediate pressure compressor; and the shaft is a first shaft, the gas turbine engine further comprising a second shaft coupling the high pressure turbine to the high pressure compressor.

18. The gas turbine engine according to claim 9, wherein a ratio of a tip maximum thickness of the second blades to the tip maximum thickness of the first blades is less than 0.45.

19. The gas turbine engine according to claim 18, wherein the ratio of the tip maximum thickness of the second blades to the tip maximum thickness of the first blades is greater than 0.10.

20. The gas turbine engine according to claim 18, wherein the tip maximum thickness of the second blades is between 1.2 mm and 2.25 mm.

* * * * *